Dec. 22, 1964 H. ZARM 3,162,446

SPEED CHANGER FOR A RECORD PLAYER

Filed Dec. 23, 1960 4 Sheets-Sheet 1

INVENTOR
HORST ZARM

BY Frank R. Jerifari
AGENT

INVENTOR
HORST ZARM
BY
Frank R. Jirfani
AGENT

Dec. 22, 1964 H. ZARM 3,162,446

SPEED CHANGER FOR A RECORD PLAYER

Filed Dec. 23, 1960 4 Sheets-Sheet 3

INVENTOR
HORST ZARM

BY
Frank R. [signature]
AGENT

Dec. 22, 1964 H. ZARM 3,162,446

SPEED CHANGER FOR A RECORD PLAYER

Filed Dec. 23, 1960 4 Sheets-Sheet 4

INVENTOR
HORST ZARM

BY Frank R. Jiufoni
AGENT 3,162,446

SPEED CHANGER FOR A RECORD PLAYER

Horst Zarm, Berlin-Zehlendorf, Germany, assignor to North American Philips Company, Inc., New York, N.Y., a corporation of Delaware Filed Dec. 23, 1960, Ser. No. 77,977
Claims priority, application Germany Jan. 18, 1960
4 Claims. (Cl. 274—9)

This invention relates to a device for the automatic switching of the number of revolutions of apparatus for reproducing sound recordings in disc form of different diameters, in which a switchable reduction device is provided between the driving motor and the turntable, which reduction device is switched by a feeler which operates in accordance with the diameter of the disc record.

Such devices are already known in record changers. Such record changers have a feeler for the diameter of the record and the switching of the number of revolutions is for example performed in a manner such that the feeler influences an adjusting member which in its turn is actuated by the mechanism of the record changer and produces a corresponding shift of the change-over device of a reduction device in accordance with the adjustment of this adjusting member, which reducing device is provided between the driving motor and the turntable. It is obvious that the construction of the switching of the number of revolutions of such a record changer would be rather complicated.

If a semi-automatic reproduction device for sound recording in disc form of different diameter should be provided with such a switch of the number of revolutions, this is not possible as such, since the mechanical power for the switching operation of the reduction device, which in the case of the record changer, is made available by the changing mechanism, is not available in this case as such. By a semi-automatic reproduction device is to be understood a device in which the sound carriers are slid into the turntable from the side through a slit of the housing, are scanned for their size, and all the operations of switching-on are started automatically as soon as the disc has reached its position for reproduction. For this purpose, such reproduction devices are provided with a slide which is shiftable in the direction of insertion of the disc, which slide is shifted farther in accordance with the diameter of the disc. The shifting of this slide releases the required shifting operations which are necessary to start the operations of reproduction. If such a reproduction device is to be provided with a switch for the number of revolutions of the above mentioned type, an even more complicated construction would be the result since the power requirement necessary for switching the reduction device, which power in the known devices is supplied by the changing mechanism, is not available here.

According to the invention, this drawback is overcome by using in a semi-automatic reproduction device having a slide shiftable into the direction of insertion of the disc, which slide is shifted farther by the feeler according as the diameter of the disc is larger, a coupling between slide and switching device which adjust the reproduction device at the number of revolutions corresponding to said disc as soon as the slide is shifted in a position associated with the diameter of the disc.

When using an electric-motor driving the turntable by means of a shaft, graded in diameter, by means of a friction wheel, a control lever swingable about a pivot and having a curved side constructed as a control curve may advantageously be used, said curved side being capable of sliding along a stop member of the slide, the control lever being connected to the drive of the turntable in a manner such that in the case of a swinging motion the friction wheel is shifted axially with respect to the shaft of the motor.

According to one embodiment of the invention, the electric motor, when the friction wheel is provided on the mounting plate, is provided in a shiftable manner in the direction of the axis of its shaft and the control lever is provided with an inclined control plane or control side which may act on a sliding member of the motor mount and, when swinging the control lever, may shift the motor axially.

Preferably the device according to the invention is constructed so that the friction wheel at the mounting plate is pivoted so as to be able to be removed from the motor shaft in a swinging device pressing the friction wheel by means of a spring against the motor shaft and the turntable and that a connection between the slide and swinging device is available which hoists the friction wheel into the rest position of the slide and, right after the slide has left its rest position, forces the friction wheel into engagement with the motor shaft.

As a connection between the slide and swinging device may be used a connecting rod linked to the control lever engaging a pivot of the swinging device by means of an oblong hole, the length of which is sufficient to permit unhindered swinging of the control lever in all operating conditions.

In order that the invention may be readily carried into effect, it will now be described in greater detail, by way of example, with reference to the accompanying drawings, in which FIGURE 1 shows the essential parts of a device according to the invention in plan view, namely in the position with inserted record of 17 cms. diameter.

Figure 1:
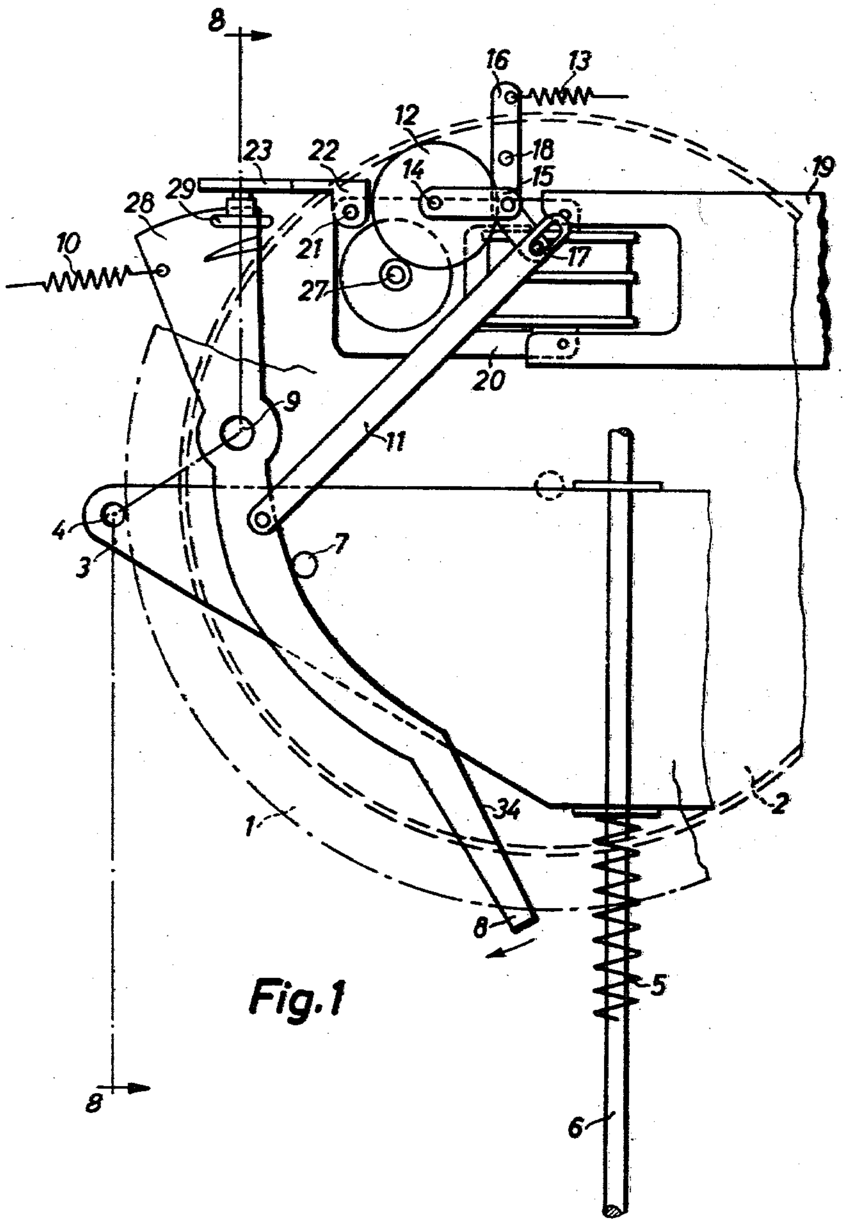

In FIGURE 1, a disc of 17 cms. diameter lying on the turntable 2 is indicated by a semi-circular dot-and-dash-line and indicated by the numeral 1. When inserting this disc, which in the drawing occurs from the top downwards, the disc moves on a sliding bar 6, in a manner to be described afterwards, a slide 3, the edge of the disc engaging the feeler pins 4. Only one of these feeler pins is shown in FIGURE 1.

The slide is shifted in the position shown against the action of the spring 5. On the base plate of the reproduction device, a control lever 8 is provided about a pivot 9 in a swingable manner and this lever is brought in the position shown by a stop member 7 attached to the slide 3, which stop member slides along a curved edge of the control lever 8. In addition, a sliding rod 11 is connected to the control lever 8, which rod has an oblong hole at its free end. In this oblong hole a pivot 17 of a swinging device 16 is geared which may be swung about a pivot 18 provided on the base plate and which is under the action of a helical spring 13. Connected to it is in addition a lever 15 which at its free end is provided with the friction wheel 12 serving as coupling between the shaft 27 of the driving motor 20 and the edge of the turntable 2.

When starting the shifting of the slide 3, the control lever 8 initially performs a slight swinging motion which, however, is sufficient to release the friction wheel 12 which, under the action of the spring 13 forces itself between the motor shaft 27 and the edge of the turntable. In the rest condition the friction wheel was hoisted from the motor shaft and the edge of the turntable by the action of the sliding bar upon the swinging device 16.

Figure 5:
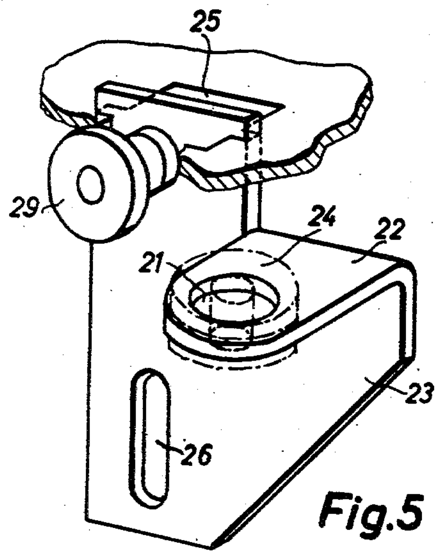
FIGURE 5 is a diagrammatic representation of the sliding member used.
Figure 6:
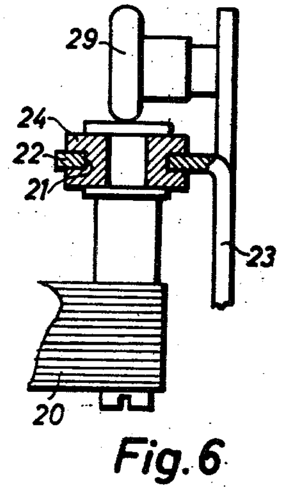
FIGURE 6 shows the connection between sliding member and the driving motor.

The driving motor 20 is connected to an elongated support 19 having a certain elasticity and which sees to it that the motor 20 is pressed from the base plate downwards. A sliding member 23 is connected to the motor, while the upper end of the two-armed control lever 8 has a curved face 28 on which the sliding member 23 may be shifted by means of the roller 29. When swinging the control lever 8, the motor 20 is consequently moved towards the base plate and removed from it respectively. The sliding member 23 movable at right angles to the plane of the drawing in addition has, as shown in FIG. 6, a sleeve 34 of elastic material preventing the transmission of shocks, vibrations and noises between motor 20 and base plate. In addition, the sliding member at its upper end is provided in an aperture 25 of the base plate and connected in the oblong hole 26 by means of a bolt or the like (see FIGURE 5).

Figure 7:
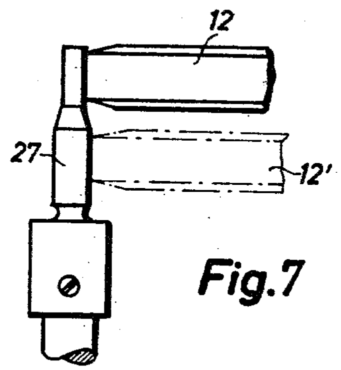
FIGURE 7 is the reduction device used here.

When swinging the control lever 8, the roller 29 and the sliding member slide on the face 28 upwards or downwards and the motor also moves in this manner, in which it is shifted through a negligibly small angle about the remote connection point of the strip 19. During this movement of the motor, the motor shaft 27 slides relatively to the fixed friction wheel 12 out of the position 12 into the position 12′ (FIGURE 7) or the other way about, resulting in the different numbers of rotation of the turntable. The present embodiment comprises two different numbers of rotation but, if necessary, the device may also be constructed so that more than two numbers of rotation can be used.

Figure 2:
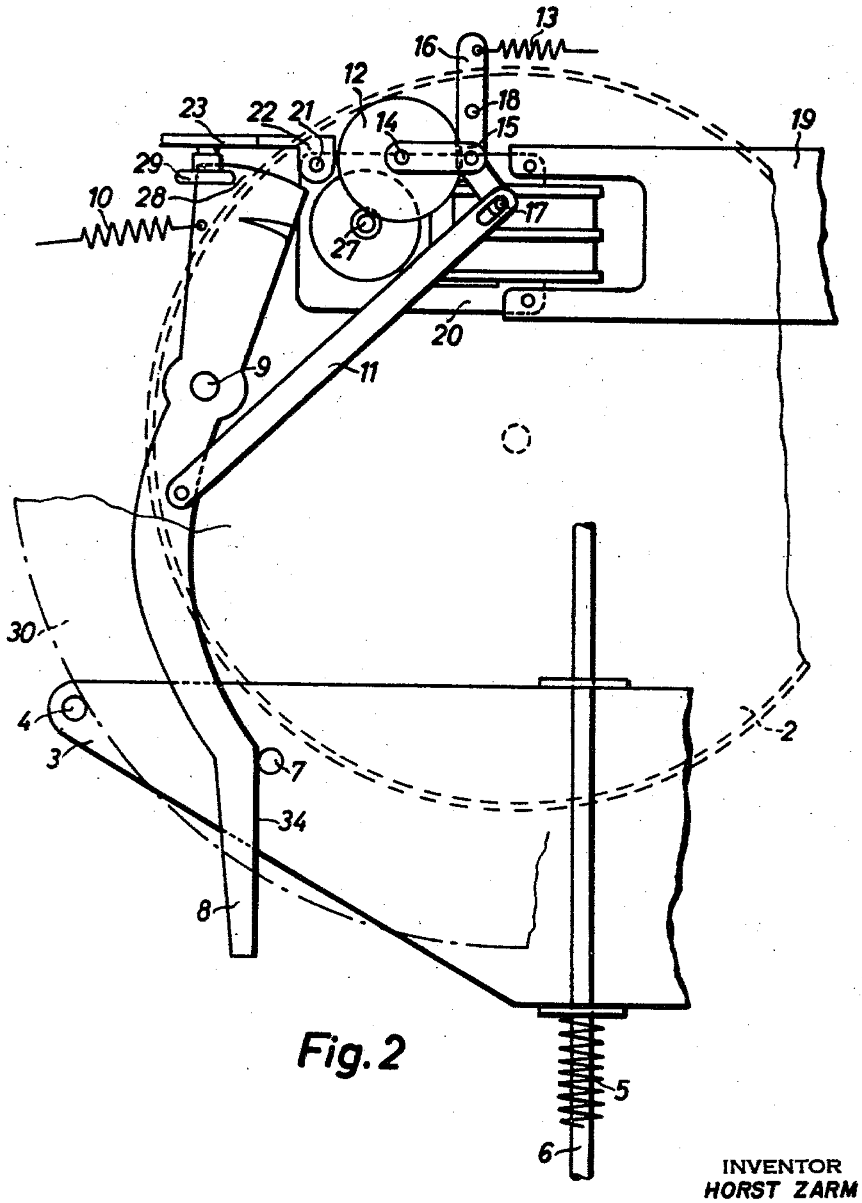
FIGURE 2 shows the same view with an inserted disc of 25 cms. diameter.
Figure 4:
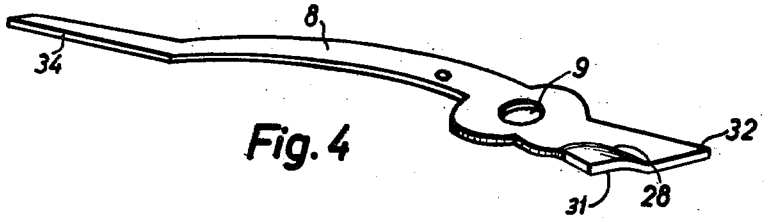
FIGURE 4 is a diagrammatic representation of the control lever used in this device.
Figure 8:
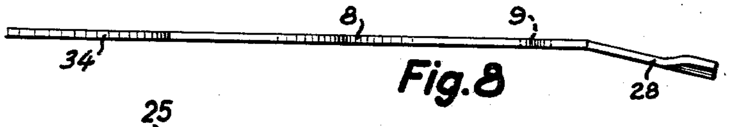
FIGURE 8 is a sectional view taken along the lines 8—8 of FIG. 1.

In the adjustment of the slide 3 as shown in FIGURE 1, the control lever 8 occupies the position as shown and the sliding member 23 is in the position which results in the basic number of rotations of 45 r.p.m. of the turntable. This basic number of rotations is also adjusted when the slide 3 is in its rest position, so when no disc is inserted. If on the contrary a disc is inserted of a larger diameter, namely, as shown in FIGURE 2, a disc 30 of 25 cms. diameter, the slide 3 is correspondingly removed farther from the centre of the disc and has swung the control lever 8 in a position shown in FIGURE 2 by means of the stop member 7. In this swinging motion, the roller 29 on the face 28 has moved from point 31 (FIGURE 4) to point 32. The sliding member 23 has moved downwards correspondingly and with it the motor 20, so that now the friction wheel 12 occupies the top position shown in FIGURE 7. As a result of this, the smaller speed of the turntable is adjusted, for example 33⅓ r.p.m.

When inserting a disc of 30 cms. diameter, a further switching of the speed may not occur since also these discs are destined for 33⅓ r.p.m. Therefore the control lever 8 at its extreme end is shaped so that shifting of the stop member 7 does not result in a further swinging of the control lever 8. The slide in question of the control lever 8 therefore runs parallel to the sliding bar 6 shown in FIGURE 2 and in FIGURE 3.

Figure 3:
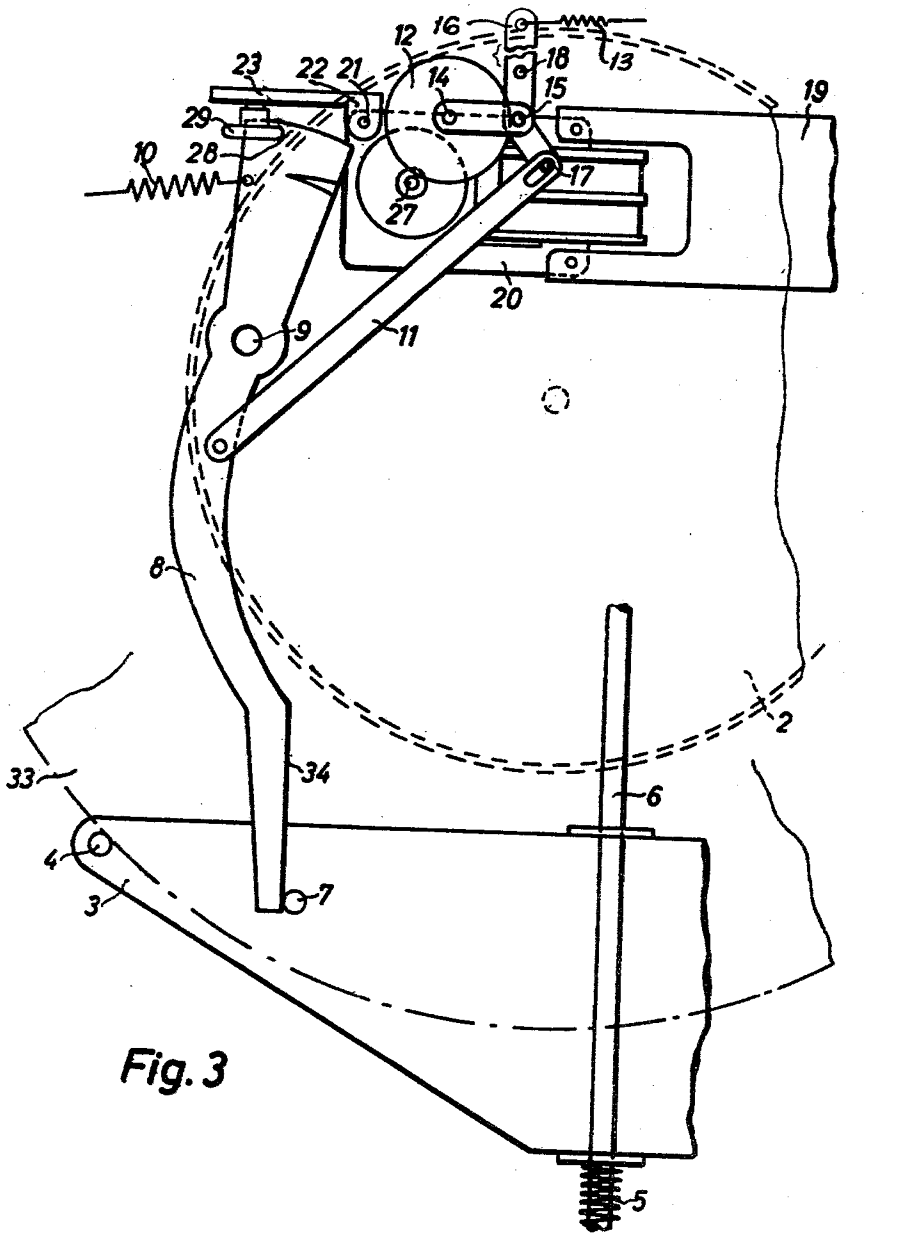
FIGURE 3 shows the same view with inserted disc of 30 cms. diameter.

When swinging the control lever 8 into the final position shown in FIGURE 2 and also into the final position shown in FIGURE 3, the swinging rod 11 has shifted it is true but owing to a sufficient length of the oblong hole at the free end of the swinging bar it is prevented that these movements of the swing bar 11 can influence the friction wheel 12.

After completion of the play, the disc in the reproduction devices considered here is again removed through the slide 3 for which purpose the energy stored in the spring 5 is used. The stop member 7 is returned to its rest position, releases the control lever 8 and the latter is turned back into its rest position by the spring 10. Through the face 28, the roller 29 and the sliding member 23, it lifts the motor 20 again, so that again the basic number of rotations of 45 r.p.m. is adjusted. In addition, the inside end of the oblong hole of the sliding bar 11 comes in contact with the pivot 17 and hoists the friction wheel, via the swinging device 16 and the lever 15, from the motor shaft 27 and the edge of the turntable. It is noted that instead of the sliding bar 11 also a fixed bar may be provided on the slide 3 resulting in the same operation. However, the spring 5 should be chosen to be more powerful.

What is claimed is:

1. An automatic switching device for changing the rotational speed of a record player comprising a turntable, a driving motor for rotating said turntable, a drive shaft operatively connected to said motor and having parts thereof of different diameters, a friction wheel, a pivoting control lever having a curved edge serving as a control curve coupling, a slide swingable in the direction of the insertion of the record, said slide being provided with a stop member, said curved edge sliding along said stop member, said control member being operatively connected to said friction wheel whereby the latter is shifted axially with respect to said drive shaft of the motor, a switchable reduction device provided between said driving motor and said turntable, a feeler member operatively connected to said switchable reduction device whereby the former operates the latter in accordance with the diameter of the particular record to be played, said slide also being moved by said feeler if a larger diameter record is inserted in the phonograph record presently being played, and said coupling adjusting the dive shaft to the rotational speed required for the particular record diameter to be played after said slide is located at the preselected position for the particular record diameter to be played.

2. An automatic switching device for changing the rotational speed of a record player as claimed in claim 1 further comprising means for shifting said motor in the axial direction of its drive shaft, said pivoting control lever being provided with an inclined face portion which upon a predetermned movement thereof acts upon said means to shift said motor in the axial direction of its drive shaft.

3. An automatic switching device for changing the rotational speed of a record player comprising a turntable, a driving motor for rotating said turntable, a drive shaft operatively connected to said motor and having parts thereof of different diameters, a friction wheel, a pivoting control lever having a curved edge serving as a control curve coupling, a slide swingable in the direction of the insertion of the record, said slide being provided with a stop member, said curved edge sliding along said stop member, said control member being operatively connected to said friction wheel whereby the latter is shifted axially with respect to said drive shaft of the motor, a switchable reduction device provided between said driving motor and said turntable, a feeler member operatively connected to said switchable reduction device whereby the former operates the latter in accordance with the diameter of the particular record to be played, said slide also being moved by said feeler if a larger diameter record is inserted in the phonograph record presently being played, and said coupling adjusting the drive shaft to the rotational speed required for the particular record diameter to be played after said slide is located at the preselected position for the particular record diameter to be played, a swinging device operatively connected to said friction wheel, a spring biasing said friction wheel through said swinging device against said drive shaft and the turntable, and a sliding rod connection between the slide and the swinging device which lifts the friction wheel in the rest position of the slide and after said slide has left its rest position forces said friction wheel into driving engagement with said drive shaft.

4. An automatic switching device for changing the rotational speed of a record player as claimed in claim 3 wherein said sliding rod connection at its point of connection with said swinging device is provided with an oblong hole, the length of which is sufficient to permit the unhindered swinging of said control lever in all operating conditions thereof.

References Cited in the file of this patent

UNITED STATES PATENTS

| | | |
|---|---|---|
| 2,943,861 | Redfield | July 5, 1960 |
| 2,966,358 | Cleybergh | Dec. 27, 1960 |